(No Model.)
T. A. EDISON.
DYNAMO OR MAGNETO ELECTRIC MACHINE.
No. 263,146. Patented Aug. 22, 1882.
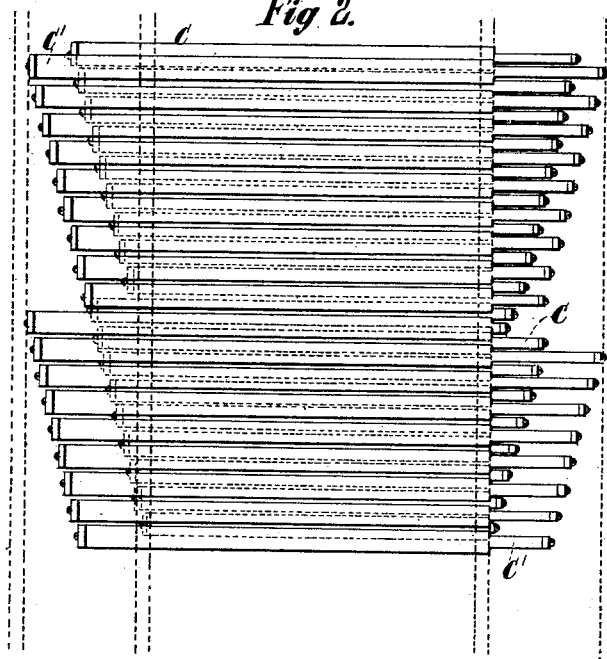
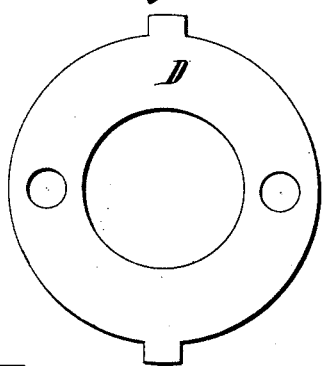
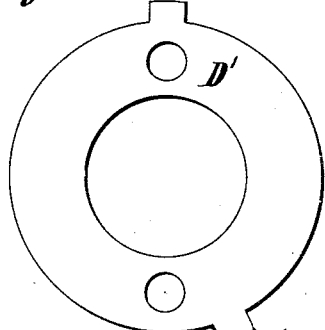
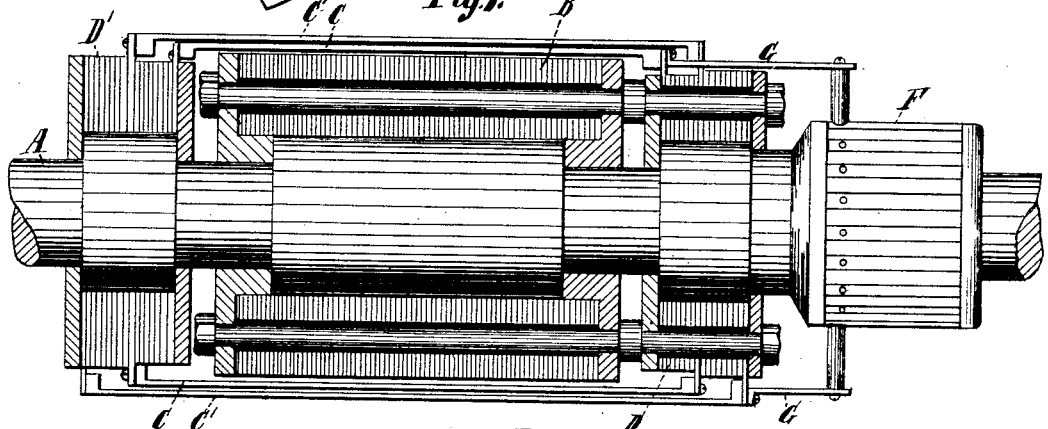
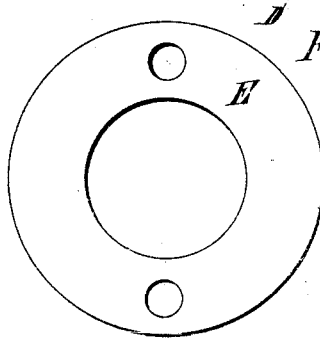
WITNESSES:
O. D. Mott
Thomas E. Birch
INVENTOR:
T. A. Edison
BY Dyer & Wilber
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

DYNAMO OR MAGNETO ELECTRIC MACHINE.

SPECIFICATION forming part of Letters Patent No. 263,146, dated August 22, 1882.

Application filed November 29, 1881. (No model.)

*To all whom it may concern:*

Be it known that I, THOMAS A. EDISON, of Menlo Park, in the county of Middlesex and State of New Jersey, have invented a new and useful Improvement in Dynamo or Magneto Electric Machines, (Case No. 372;) and I do hereby declare that the following is a full and exact description of the same, reference being had to the accompanying drawings, and to the letters of reference marked thereon.

My invention relates to dynamo or magneto electric machines or electric engines of that class wherein the inductive or conducting portion of the armature is composed of longitudinal bars or strips of copper connected at the ends of the armature by copper disks or rings; and my object is to construct and arrange the inductive or conducting bars of such a machine so that the machine will be more economical in construction and the bars can be more conveniently and economically insulated from each other.

In carrying out my invention the alternate bars, instead of being bent over the end connections of the two adjoining bars, as shown and described in my application No. 43,165, filed October 4, 1881, are made straight and are laid upon and wholly outside of the adjoining bars. This enables the bars to be widened, so that those of each layer approach close to one another, two layers of longitudinal bars or strips being thus formed, each of which covers substantially the whole of the armature. These longitudinal bars or strips are connected at their ends by copper disks or rings insulated from each other, the same as if such bars were arranged in one layer. The double winding is in effect a single winding with the alternate bars located in an outer layer. All the inductive bars are separately wrapped with a suitable insulating covering, and in addition the inner layer of bars or plates is separated from the outer layer by additional insulation. At one end of the armature the connections of the alternate bars with the disks are connected with the bars of the commutator-cylinder.

The foregoing will be better understood from the drawings, in which Figure 1 is a section through an armature of a dynamo or magneto electric machine embodying my invention; Fig. 2, a view of the bars or strips laid out, the vertical dotted lines representing the plates between which the cross connecting disks or rings are clamped. Figs. 3 and 4 are views of the copper disks or rings, and Fig. 5 the insulating disk or ring.

A is the armature-shaft, upon which is secured the core B of the armature.

C C' are the longitudinal bars or strips of copper, and D D' the cross connecting rings or disks of copper, those of each set being separated by disks or rings of insulating material E.

F is the commutator-cylinder, and G the rods extending from the junctures of alternate bars with the lugs on the disks, to the bars of such commutator-cylinder. These outside commutator-connections may have the full conducting-power of the inductive bars themselves. The bars of each layer are arranged opposite the spaces between the bars of the other layers, or so that the bars of the two layers will break joints. This permits the use of the outside commutator-connections, which, for bars of the inner layer, pass between the lugs on the bars of the outer layer, such lugs being narrowed for that purpose at that end of the machine, as shown in Fig. 2.

It is evident that three or more layers of copper bars or strips with cross connecting disks or rings and outside commutator-connections might be arranged in this way without departing from the spirit of my invention.

What I claim is—

1. In armatures for dynamo or magneto electric machines or electric engines, the two layers of copper bars or strips, in combination with cross connecting disks or rings, substantially as set forth.

2. The combination, with the two layers of copper bars or strips and the cross connecting disks or rings, of the outside commutator-connections, substantially as set forth.

3. In armatures for dynamo or magneto electric machines or electric engines, the combination of the two layers of copper bars or strips breaking joints, substantially as set forth.

4. The combination of the two layers of copper bars or strips, arranged to break joints, the cross connecting disks or rings, and the outside commutator-connections, substantially as set forth.

This specification signed and witnessed this 22d day of November, 1881.

THOS. A. EDISON.

Witnesses:
RICHD. N. DYER,
H. W. SEELY.